May 7, 1940.  W. C. BOLDT  2,199,688
SPROCKET WHEEL
Filed April 4, 1938
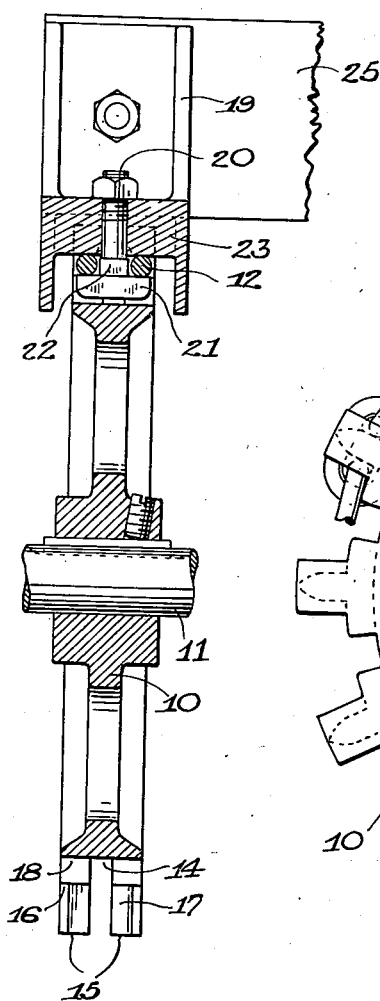
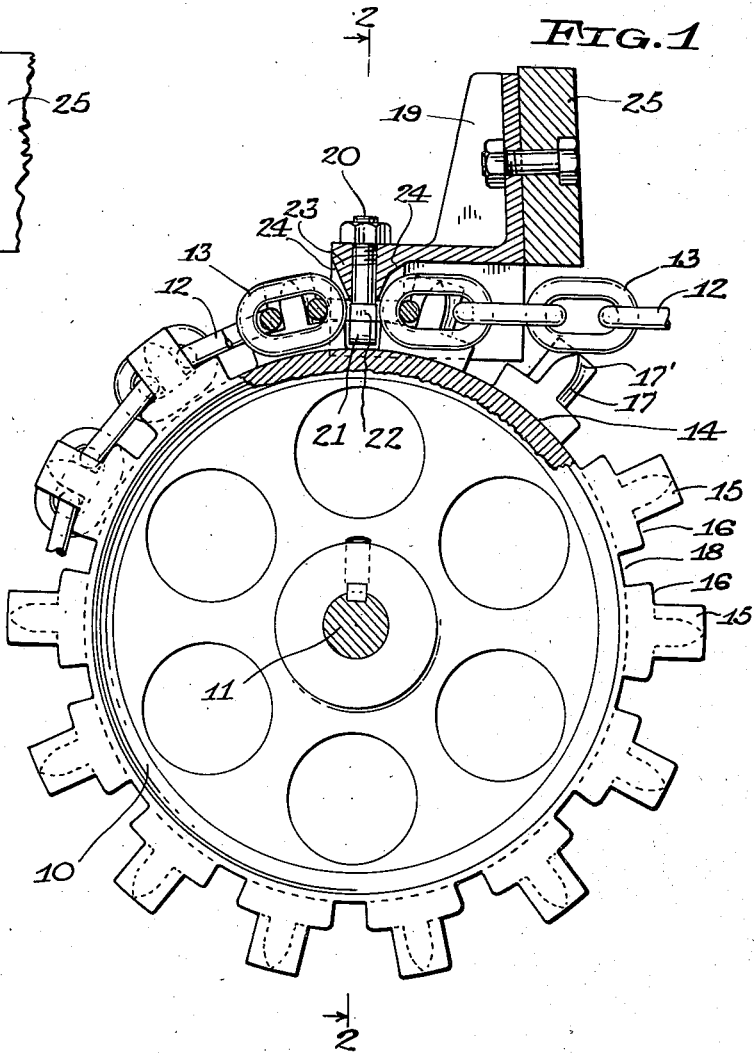
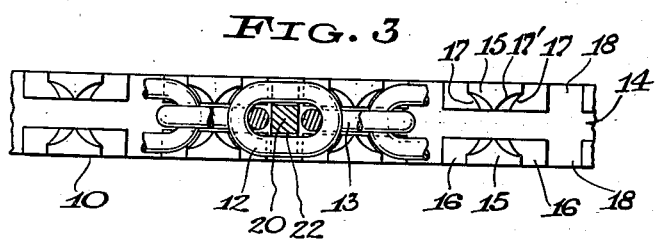
WITNESSES
L. E. Kilian
C. L. Waal
INVENTOR
William C. Boldt
By R. C. Caldwell
ATTORNEY Patented May 7, 1940

2,199,688

UNITED STATES PATENT OFFICE 2,199,688

SPROCKET WHEEL

William C. Boldt, Waukesha County, Wis.

Application April 4, 1938, Serial No. 199,844

4 Claims. (Cl. 74—243)

The invention relates to sprocket wheels, and has for an object to provide an improved sprocket wheel of strong, durable and light weight construction adapted for use with ordinary link chain or logging chain, and of such character as to minimize accumulation of foreign matter and to avoid interference with conveyor parts or other fittings attached to the chain.

The invention further consists in the several features hereinafter described and claimed.

In the accompanying drawing, illustrating an embodiment of the invention,

Fig. 1 is a side elevation of a sprocket wheel constructed in accordance with the invention, as it appears with an associated chain conveyor, parts being broken away and parts being shown in section;

Fig. 2 is a sectional elevation taken generally along the line 2—2 of Fig. 1, and Fig. 3 is a developed edge view of the sprocket wheel, a portion of the chain being shown therewith, and parts being shown in section.

In the drawing, 10 designates a sprocket wheel which is keyed or otherwise mounted on a shaft 11. The sprocket wheel cooperates, as hereinafter described, with the oval links 12 and 13 of an ordinary chain, sometimes known as a logging chain, the planes of the successive links 12 and 13 being arranged at right-angles to each other. The links 12 and 13 may be designated as flatwise and edgewise links, respectively. A central peripheral groove 14 is formed in the sprocket wheel 10 and has a width slightly greater than the link thickness and a depth about equal to the link width. The sprocket wheel has peripherally spaced pairs of teeth 15 arranged in two rows, the teeth in each pair being arranged at opposite sides of the groove 14 and defining the parallel side walls of the groove. At the base of each tooth are opposite ledges 16 on which the ends of the flatwise links 12 are adapted to rest, the edgewise links, 13, lying in the radial plane of the groove 14. The ledges 16 at both sides of the wheel extend to the corresponding outer side walls of the wheel. At its inner side, each tooth 15 has a pair of longitudinal recesses 17 of concave cross-section extending in an approximately radial direction to the ledges 16, the outer ends, 17', of these recesses being widened adjacent the inner face of the tooth, as seen in Fig. 1, to facilitate entry and departure of the flatwise links. The space between each two adjacent pairs of teeth forms a link-receiving pocket for a flatwise link, the pocket opening at the opposite outer side walls of the wheel. The rounded ends of the chain links 12 are adapted to rest on the ledges 16 and to extend into the concave recesses 17 of the teeth, and in the case of a power-transmitting sprocket wheel the walls of the concave recesses 17 form driving abutments engageable with the rounded ends of these links. The width of the toothed rim of the sprocket wheel is approximately equal to the normal width of a link.

Between adjacent peripherally spaced pairs of teeth, the sprocket wheel is provided with transverse notches or channels 18 extending to the bottom of the peripheral groove 14 and opening at the opposite outer side walls of the wheel. The notches 18 and the spaces between the teeth of each row provide clearance openings which prevent accumulation of foreign matter on the sprocket wheel, and the notches 18 also provide clearance for bracket-attaching means hereinafter described.

When the chain forms a part of a conveyor, such as is used in barn cleaning apparatus, it is necessary to attach fittings of various kinds to the chain as by means of T-bolts or U-bolts. In the conveyor illustrated, a flanged chair-shaped bracket 19 straddles the chain and is attached to the chain by a bolt 20 which is here indicated to pass centrally through one of the flatwise links 12, the bolt having a T-head 21 engaging the inner side of the link 12 and having a square portion 22 within the link to prevent relative rotation of the bolt and link. The T-head 21 of the bolt extends transversely of the link and occupies a transverse notch 18 of the sprocket wheel when the bolt-carrying link passes around the wheel. The bracket has a thickened apertured transverse rib portion 23 engaging the outer face of the link 12 and extending into the space between the successive pairs of sprocket teeth, the transverse portion 23 having notches 24 to provide clearance for the rounded ends of the adjacent links 13. An outwardly projecting portion of the bracket has bolted or otherwise secured thereto the end of a sweep or scraper 25, the other end of the sweep being mounted in a similar manner. Other similar sweeps, not shown, may be mounted at intervals on the chain. The chain-straddling brackets 19 also serve to guard the chain against abrasion where they come close to stationary surfaces.

In the case of a conveyor, the chain is preferably endless, and in addition to being carried on the sprocket wheel 10, the chain also passes over a second support, not shown, usually another sprocket wheel.

In operation, the sprocket wheel 10 is driven by a suitable source of power, not shown, and transmits motion to the chain, the concave walls of the tooth recesses 17 presenting driving abutments engageable with the links 12. The flatwise links 12 of the run of the chain approaching the sprocket wheel seat on the ledges 16, the rounded ends of these links being positioned by the concave walls of the tooth recesses 17. The edgewise links 13, which lie in the central radial plane of the sprocket wheel, enter the peripheral groove 14 of the wheel and are confined laterally by the flat parallel opposite walls of this groove, both the inner and outer lengths of these links being guided by the walls of the groove. The sweep-supporting bracket 19 straddles the sprocket wheel as it passes around it, and the T-head 21 of the bracket-attaching bolt 20 enters one of the transverse grooves 18 of the wheel, the bolt extending radially of the wheel. During the travel of the conveyor, the sweep or scraper 25 carries along the barn refuse and moves it out of the barn. In the operation of the conveyor, foreign matter may be deposited on the sprocket wheel, but the construction of the wheel prevents undue accumulation of such material on the wheel, the excess material either falling out of the wheel, or being forced out of the laterally open toothed periphery of the wheel, so as not to interfere with the proper meshing of the chain and wheel.

Since the rim portion of the wheel is relatively narrow, being approximately the width of a flatwise link, the likelihood of accumulation of foreign matter on the wheel is greatly reduced, and any foreign matter deposited thereon is readily removed. Furthermore, by making the rim portion of the wheel relatively narrow, the rim portion can readily be accommodated in a limited working space slightly wider than the chain. The narrow rim portion also permits a substantial reduction in weight while still possessing adequate strength. When conveyor attachments are mounted on the chain, the U-bolts hereinbefore referred to can be used as readily as T-bolts, as the transverse notches or channels 18 open at the opposite side walls of the wheel.

What I claim as new and desire to secure by Letters Patent is:

1. A sprocket wheel for logging-type chain with rounded-end links arranged alternately flatwise and edgewise, having a peripheral groove adapted to receive the edgewise links therein and having pairs of peripheral teeth arranged in two axially spaced rows, the teeth in each pair being opposed and arranged on opposite sides of said groove, said teeth being adapted to laterally confine the edgewise links and to engage the rounded ends of the flatwise links, the space between each two adjacent pairs of teeth forming a link-receiving pocket open at both sides and adapted to longitudinally confine a flatwise link, and said wheel having a transverse groove formed between adjacent pairs of said teeth and extending to the opposite outer side walls of the wheel and to the bottom of said peripheral groove.

2. A sprocket wheel for logging-type chain with rounded-end links arranged alternately flatwise and edgewise, having a peripheral groove adapted to receive the edgewise links therein and having pairs of peripheral teeth arranged in two axially spaced rows, the teeth in each pair being opposed and arranged on opposite sides of said groove, said teeth being adapted to laterally confine the edgewise links and to engage the rounded ends of the flatwise links, the space between each two adjacent pairs of teeth forming a link-receiving pocket adapted to longitudinally confine a flatwise link, each tooth having link-supporting ledges adjacent its base portion and at a greater radius than the bottom of said groove, said ledges being adapted to support the rounded ends of the flatwise links and extending to the outer side walls of the wheel, and the spaces between successive pairs of said teeth being open to the opposite outer sides of the wheel.

3. In a conveyor having logging-type chain with the links arranged alternately flatwise and edgewise and provided with a conveyor attachment secured by a fastening member to one of said flatwise links, a sprocket wheel having a peripheral groove adapted to receive and laterally confine the edgewise links therein and having pairs of peripheral teeth arranged in two axially spaced rows, the teeth in each pair being opposed and arranged on opposite sides of said groove and being adapted to engage the ends of the flatwise links, the space between two adjacent pairs of said teeth forming a pocket open at both sides and adapted to receive and longitudinally confine said attachment-holding link, said wheel being transversely notched to its opposite sides between said adjacent pairs of teeth to pass foreign matter from said groove and to provide clearance for said fastening member.

4. In a conveyor having logging-type chain with rounded-end links arranged alternately flatwise and edgewise, a sprocket wheel having a rim portion approximately the width of said flatwise links and having a peripheral groove to receive and laterally confine the edgewise links, said rim portion having pairs of peripheral teeth arranged in two axially spaced rows, the teeth in each pair being opposed and defining the opposite sides of said groove, each two adjacent pairs of said teeth being adapted to longitudinally confine a flatwise link and being engageable with the rounded ends of said link, and said rim portion having a transverse groove formed between adjacent pairs of said teeth and extending to and opening at the opposite sides of said rim portion and also extending to the bottom of said peripheral groove.

WILLIAM C. BOLDT.